(12) United States Patent
Zhan et al.

(10) Patent No.: US 11,030,803 B2
(45) Date of Patent: Jun. 8, 2021

(54) METHOD AND APPARATUS FOR GENERATING RASTER MAP

(71) Applicant: Baidu Online Network Technology (Beijing) Co., Ltd., Beijing (CN)

(72) Inventors: Yifei Zhan, Beijing (CN); Miao Yan, Beijing (CN); Wang Zhou, Beijing (CN); Xiong Duan, Beijing (CN); Xianpeng Lang, Beijing (CN); Changjie Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/230,671

(22) Filed: Dec. 21, 2018

(65) Prior Publication Data

US 2019/0206122 A1 Jul. 4, 2019

(30) Foreign Application Priority Data

Dec. 29, 2017 (CN) .......................... 201711485401.0

(51) Int. Cl.
*G06T 17/05* (2011.01)
*G06T 17/00* (2006.01)
(Continued)

(52) U.S. Cl.
CPC .............. *G06T 17/05* (2013.01); *G01C 21/32* (2013.01); *G01S 17/86* (2020.01); *G01S 17/89* (2013.01);
(Continued)

(58) Field of Classification Search
CPC ......... G06T 17/05; G06T 17/005; G06T 9/00; G06T 2210/36; G01S 17/931; G01S 17/86; G01S 17/89; G01C 21/32
See application file for complete search history.

(56) References Cited

U.S. PATENT DOCUMENTS 9,600,929 B1 * 3/2017 Young ...................... G06T 1/60
2007/0229501 A1 * 10/2007 Kouznetsov ............ G06T 17/10
345/424
(Continued)

FOREIGN PATENT DOCUMENTS

CN 1702432 A 11/2005
CN 1971560 A 5/2007
(Continued)

OTHER PUBLICATIONS

Hornung, Armin, et al. "OctoMap: An efficient probabilistic 3D mapping framework based on octrees." Autonomous robots 34.3 (2013): 189-206. (Year: 2013).*

(Continued)

*Primary Examiner* — Daniel F Hajnik
(74) *Attorney, Agent, or Firm* — Nixon Peabody LLP (57) ABSTRACT

A method, apparatus, and computer readable medium for generating a raster map are provided. The method includes generating a first raster map having a first resolution based on acquired laser point cloud. The method further includes generating a second raster map having a second resolution by merging rasters in the first raster map, the second resolution being lower than the first resolution. In addition, the method further includes storing the first raster map and an association between the first raster map and the second raster map. Some embodiments of the present disclosure are capable of meeting different levels of navigation or positioning requirements by generating raster maps of multiple resolutions. Furthermore, some embodiments of the present disclosure store only the raster map having the highest resolution and the association between the various levels of maps, thereby saving the storage space.

15 Claims, 5 Drawing Sheets

(51) Int. Cl.
  *G01S 17/89* (2020.01)
  *G06T 9/00* (2006.01)
  *G01C 21/32* (2006.01)
  *G01S 17/86* (2020.01)
  *G01S 17/931* (2020.01)

(52) U.S. Cl.
  CPC .............. *G01S 17/931* (2020.01); *G06T 9/00* (2013.01); *G06T 17/005* (2013.01); *G06T 2210/36* (2013.01)

(56) References Cited

U.S. PATENT DOCUMENTS

| | | | |
|---|---|---|---|
| 2007/0262988 A1 | 11/2007 | Christensen | |
| 2014/0005933 A1 | 1/2014 | Fong | |
| 2015/0003683 A1* | 1/2015 | Grewe | H04N 5/23232 382/104 |
| 2015/0003686 A1 | 1/2015 | Xiong | |
| 2015/0268058 A1* | 9/2015 | Samarasekera | G06K 9/00637 701/409 |
| 2016/0321781 A1 | 11/2016 | Mann | |
| 2017/0214943 A1 | 7/2017 | Cohen | |
| 2017/0345321 A1* | 11/2017 | Cross | G08G 5/0052 |
| 2019/0271780 A1* | 9/2019 | Bravo Orellana | G01S 17/42 |

FOREIGN PATENT DOCUMENTS

| | | |
|---|---|---|
| CN | 103699641 A | 4/2014 |
| CN | 105787873 A | 7/2016 |
| CN | 106407408 A | 2/2017 |
| JP | 2010-160777 A | 7/2010 |
| JP | 2013-140515 A | 7/2013 |

OTHER PUBLICATIONS

Khoshelham, Kourosh, and Sander Oude Elberink. "Accuracy and resolution of kinect depth data for indoor mapping applications." Sensors 12.2 (2012): 1437-1454. (Year: 2012).*

Andreas Geiger et al.; "3D Traffic Scene Understanding from Movable Platforms"; IEEE Transactions on Pattern Analysis and Machine Intelligence, vol. 36, No. 5, pp. 1012-1025; May 2014; XP 11546876 A (14 pages).

Kodagoda, R.S. et al.; "Road Curb and Intersection Detection Using a 2D LMS"; Proceedings of 2002 IEEE/RSJ Intl. Conf. on Intelligent Robots and Systems, pp. 19-24; EPFL, Lausanne, Switzerland; Oct. 2002; XP 10609222A (6 pages).

Yang, S. et al., "Real-time Globally Consistent 3D Grid Mapping," 2017 IEEE International Conference on Robotics and Biomimetics (ROBIO), 2017, pp. 929-935, doi: 10.1109/ROBIO.2017.8324536.

Shengfeng, J., "Research on 3D Point Cloud Map Construction using 3DLaser Scanner," Thesis submitted to Huazhong University of Science and Technology, May 2016.

* cited by examiner

METHOD AND APPARATUS FOR GENERATING RASTER MAP

CROSS-REFERENCE TO RELATED APPLICATIONS

This disclosure claims priority to Chinese Patent Application no. 201711485401.0, filed in China on Dec. 29, 2017, the contents of which are incorporated herein by reference in their entirety.

TECHNICAL FIELD

Embodiments of the present disclosure generally relate to the field of electronic map technology, and more specifically to a method and apparatus for generating a raster map.

BACKGROUND

Electronic maps refer to maps in digital form generated using computing technologies, which may be widely used in scenarios such as querying, positioning, and navigating. The electronic maps are generally divided into ordinary navigation maps and high-precision maps. The ordinary navigation maps are user-oriented maps that provide visual interfaces for querying by users and displaying, while the high-precision maps are machine-oriented map data that may be used for such as autonomous driving, robot navigation and positioning. The ordinary navigation maps are usually obtained by satellite mapping, and their accuracies are usually not high (for example, the error can be several meters or even tens of meters). The high-precision maps are high-precision map data that not only are highly accurate, but also include other information that may be used for precise navigation and positioning, such as lane line information, object height information, and road shape information.

A raster map is a commonly used form of high-precision map that divides an environment into a series of rasters, where each raster is marked with a value indicating whether the raster is occupied. That is, the raster map is a product of digital rasterization of a real environment that identifies obstacles in the environment by determining whether the raster is occupied. Out of the demand for the navigation and positioning of autonomous vehicles and robots, the raster map describing the occupation is widely used in the navigation and positioning scenarios for driverless vehicles and intelligent robots.

SUMMARY

According to illustrative embodiments of the present disclosure, a solution for generating a raster map is provided.

In a first aspect, the present disclosure provides a method for generating a raster map. The method includes generating a first raster map having a first resolution based on acquired laser point cloud. The method further includes generating a second raster map having a second resolution by merging rasters in the first raster map, the second resolution being lower than the first resolution. In addition, the method further includes storing the first raster map and an association between the first raster map and the second raster map.

In a second aspect, the present disclosure provides an apparatus for generating a raster map. The apparatus includes: a first map generation module, configured to generate a first raster map having a first resolution based on acquired laser point cloud. In addition, the apparatus further includes: a second map generation module, configured to generate a second raster map having a second resolution by merging rasters in the first raster map, the second resolution being lower than the first resolution; and a map storage module, configured to store the first raster map and an association between the first raster map and the second raster map.

In a third aspect, the present disclosure provides a computing device, the computing device including one or more processors; and a storage apparatus, for storing one or more programs. The one or more programs, when executed by the one or more processors, cause the computing device to implement the method or process according to some embodiments of the present disclosure.

In a fourth aspect, the present disclosure provides a computer readable medium, storing a computer program thereon, the computer program, when executed by a processor, implements the method or process according to some embodiments of the present disclosure.

It should be appreciated that the content described in the Summary of the Invention is not intended to limit the key or important features of some embodiments of the present disclosure, and is not intended to limit the scope of the present disclosure. Other features of the present disclosure will be readily understood by the following description.

BRIEF DESCRIPTION OF THE DRAWINGS

The above and other characteristics, advantages, and aspects of embodiments of the present disclosure will become more apparent by referring to following detailed description in conjunction with the accompanying drawings. In the accompanying drawings, the identical or similar reference numerals indicate the identical or similar elements, in which.

DETAILED DESCRIPTION OF EMBODIMENTS

Embodiments of the present disclosure will be described in more detail below by referring to the accompanying drawings. Although some embodiments of the present disclosure are shown in the drawings, it should be understood that the present disclosure may be implemented in various forms, and should not be construed as limited to the embodiments set forth herein. Rather, these embodiments are provided to understand the present disclosure more thoroughly and completely. It should be understood that the accompanying drawings and some embodiments of the present disclosure are only used as examples, rather than limiting the scope of protection of the present disclosure.

In the description on some embodiments of the present disclosure, the term "include" and wordings similar to the term should be understood as open-ended, i.e., "including but not limited to." The term "based on" should be understood as "at least partially based on." The term "one embodiment" or "the embodiment" should be understood as "at least one embodiment." The terms, such as "first," and "second," may refer to different or identical objects. Other explicit and implicit definitions may also be included hereinafter.

The raster map is a high-precision map that can provide higher precision than that of ordinary navigation maps. However, a traditional raster map typically only provides map data with one resolution. That is, there is only a single-scale raster map. Therefore, the traditional raster map cannot meet navigation or positioning services at different demand levels (e.g., different precision). In addition, the traditional raster map faces the problem that the old and new data are difficult to register when updating, causing difficulty in updating the raster map. Thus, the raster map is usually updated in a completely updated approach, which consumes a large amount of storage and computing resources and time cost. In addition, each of the rasters in the conventional raster map usually has only one attribute information of whether it is occupied, and the amount of information of the raster is small, so that the navigation and positioning performance are also weak.

In order to solve at least one of the above problems, some embodiments of the present disclosure propose a method and apparatus for generating a raster map. Some embodiments of the present disclosure are capable of meeting navigation or positioning requirements at different levels by generating raster maps of multiple resolutions. At the same time, some embodiments of the present disclosure store only the raster map having the highest resolution, rather than directly storing raster maps of lower resolutions, thereby saving the storage space. In addition, some embodiments of the present disclosure update the raster map by applying a point cloud registration method, thereby enabling the effect of a partial update of the map. In addition, each raster in the raster map may be extended to add other attributes according to requirements, in addition to including the traditional information of whether being occupied, thereby improving navigation and positioning capabilities. Some illustrative embodiments of the present disclosure will be described in detail below with reference to FIGS. 1-7.

Figure 1:
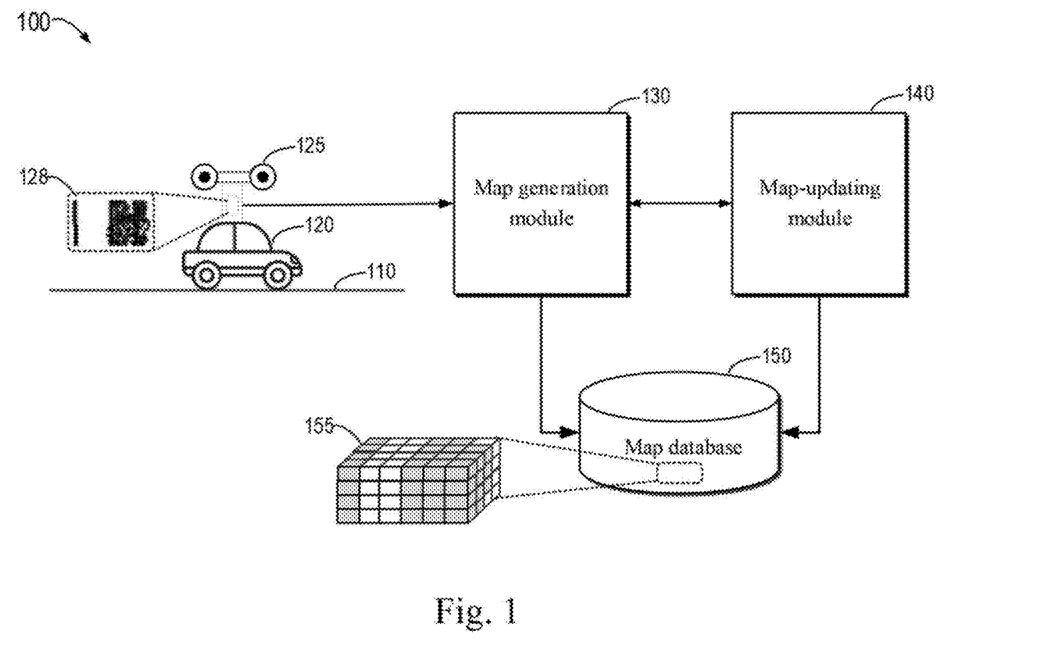
FIG. 1 shows a schematic diagram of an example environment in which some embodiments of the present disclosure can be implemented.

FIG. 1 shows a schematic diagram of an example environment 100 in which some embodiments of the present disclosure can be implemented. In the example environment 100, a data acquisition body, in this case a vehicle 120, is traveling on a road 110. The vehicle 120 has a laser acquisition device 125 affixed thereto that is capable of acquiring spatial data of the surrounding environment using a lidar. The vehicle 120 may be driven by a driver to acquire data on the road 110 in accordance with a predetermined route and/or acquisition cycle. Of course, the driver may also autonomously determine the route of acquisition and/or acquisition cycle. The vehicle 120 may be a common personal vehicle or a dedicated acquisition vehicle, or any other suitable vehicle.

The laser acquisition device 125 has a laser scanner that may acquire data of the surrounding environment (e.g., identify location of the surrounding objects, types, reflectivity, densities, curvatures, etc. of the objects) during travelling of the vehicle 120, thus forming laser point cloud (such as point cloud 128 shown in FIG. 1). In the embodiments described herein, the laser point cloud refers to a set of mass points representing the spatial distribution of the target obtained by acquiring the spatial coordinates of each sample point on the surface of the object in the environment.

In some embodiments, the laser acquisition device 125 may be an airborne lidar system with light detection and ranging (LiDAR) functionality that utilizes a global positioning system (GPS) and an inertial measuring unit (IMU) to measure the three-dimensional coordinates of the object in the environment. The laser point cloud acquired by LiDAR has the advantages of high data precision, high data density, strong penetrating ability, and strong anti-interference ability. It should be understood that the vehicle 120 and the laser acquisition device 125 may be collectively referred to as a laser acquisition entity, a laser acquisition vehicle, and the like. Moreover, the positioning system is not limited to the GPS. The Galileo satellite positioning system of Europe, the Beidou satellite positioning system of China, etc. may all be used in combination with some embodiments of the present disclosure.

As shown in FIG. 1, the environment 100 further includes a map generation module 130, a map-updating module 140, and a map database 150. The map generation module 130 may generate a raster map, which typically includes a plurality of rasters, based on the laser point cloud obtained by the laser acquisition device 125, and stores the raster map in the map database 150. The map-updating module 140 may obtain updated laser point cloud and update the data in the map database 150 by registering with the laser point cloud prior to the update (e.g., partial update may be implemented). The generated raster map (e.g., the raster map 155) is stored and managed in the map database 150. In the raster map 155, a black raster indicates that the raster is already occupied, indicating that there is an obstacle at the corresponding position, and a white raster indicates that there is no obstacle at the corresponding position. In some embodiments, the map generation module 130, the map-updating module 140, and the map database 150 may be integrated into a single computing device, collectively referred to as the computing device. Alternatively, the map generation module 130, the map-updating module 140, and the map database 150 may also be arranged separately across multiple devices.

In some embodiments, alternatively, the map generation module 130 may be locally connected to the laser acquisition device 125. For example, the map generation module 130 may also be deployed inside the vehicle 120. Alternatively, the map generation module 130 may be remotely connected to the laser acquisition device 125, such as via a wireless network. In addition, the laser point cloud acquired by the laser acquisition device 125 may also be first stored in the storage device. Then, the map generation module 130 obtains the laser point cloud from the storage device. Some embodiments of the present disclosure have no limitations with respect to how the map generation module 130 obtains the laser point cloud.

As shown in FIG. 1, the map generation module 130 may generate the raster map 155 based on the acquired laser point cloud, for example the laser point cloud 128, and store the raster map 155 in the map database 150 for invocation. According to some embodiments of the present disclosure, the map generation module 130 may also generate raster maps of multiple resolutions and store only the raster map having the highest resolution directly in the map database 150.

It should be understood by those skilled in the art that although an example of acquiring the laser point cloud on the road 110 is shown in the environment 100 of FIG. 1, the laser point cloud may also be acquired from other scenarios, for example, acquiring laser point cloud data indoor. In an indoor acquisition scenario, the acquired laser point cloud may be used for the navigation or positioning of indoor robots. In addition, although FIG. 1 shows that the three-dimensional spatial coordinates in the environment are acquired, it is also possible to acquire, for example, indoor two-dimensional plane coordinates, for navigation and positioning of robots (for example, indoor sweeping robots) and the like.

Figure 2:
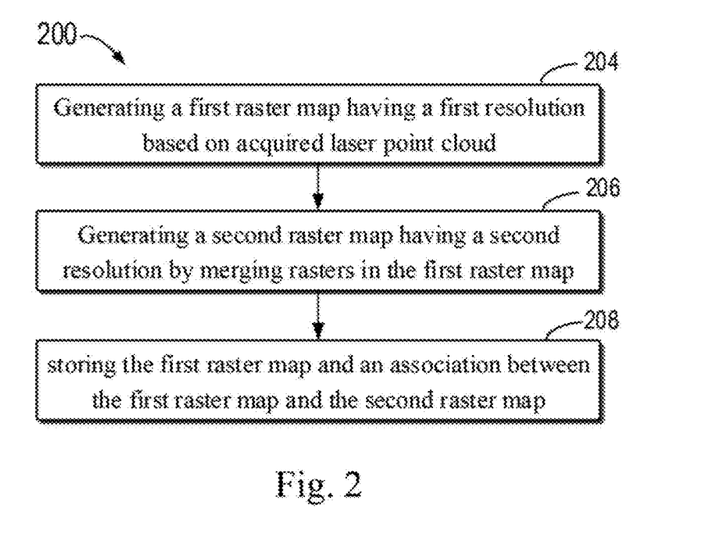
FIG. 2 shows a flowchart of a process for generating a raster map according to some embodiments of the present disclosure.

FIG. 2 shows a flowchart of a process 200 for generating a raster map according to some embodiments of the present disclosure. It should be understood that the process 200 may be performed by the map generation module 130 described above with reference to FIG. 1.

At block 204, generating a first raster map having a first resolution based on acquired laser point cloud. For example, the map generation module 130 may obtain a three-dimensional laser point cloud from the laser acquisition device 125. In general, point clouds acquired using depth cameras and ordinary sensors are not as dense and accurate as laser point clouds, and cannot meet the demand for fine navigation and positioning. In some embodiments, the map generation module 130 may first filter noise from the laser point cloud and then segment the laser point cloud at a predetermined resolution. For example, whether a point in a raster is a noise point may be determined based on the spatial neighborhood relationship between the raster maps, and the specific size of the raster map is determined based on the average point distance.

In some embodiments, a spatial grid containing laser point clouds may be first established and each raster may be set to a predetermined size (e.g., 0.125 meters or other size). If there are one or more points in the point cloud at a location corresponding to a raster, the raster may be marked as occupied; on the contrary, if there is no point at the corresponding location of the raster, the raster is marked as unoccupied, thereby enabling marking of each raster in the spatial grid.

In general, the smaller the size of each raster is, the higher its accuracy is and the higher the resolution is. That is to say, for the same spatial grid, the more the rasters are, the higher the resolution of the spatial grid is. When some embodiments of the present disclosure refer to the size of a raster of a predetermined size as the highest resolution, it represents the highest resolution in the case of such a predetermined size, and does not represent the highest resolution in all cases.

In some embodiment, a multi-dimensional attribute of each of the rasters in the first raster map may be generated. Compared with the traditional technology, each of the rasters in the raster map may be extended to add other attributes according to requirements, in addition to including the traditional occupy attribute of whether being occupied, thereby providing navigation and positioning capabilities. In some embodiments, the multi-dimensional attribute may include an average reflectivity attribute, from which the material of the obstacle in the environment may be determined. In some embodiments, the multi-dimensional attribute may include a density attribute, from which the type of the obstacle may be determined. In some embodiments, the multi-dimensional attribute may include a curvature attribute. Based on the curvature attribute, the characteristic of the curved surface of the obstacle may be fitted, which is more suitable for navigation and positioning in the three-dimensional space.

In some embodiments, the multi-dimensional attribute may also include a color attribute that represents the color of the obstacle. The color attribute may be generated based on the laser point cloud and its corresponding photo. The color of a point is determined, for example, by identifying the value of the photo's pixel corresponding to the point in the laser point cloud, thereby providing powerful navigation and positioning capabilities.

At block 206, generating a second raster map having a second resolution by merging rasters in the first raster map, the second resolution being lower than the first resolution. In some embodiments, after generating the first raster map having the highest resolution, the map generation module 130 may merge a fixed number of rasters in the first raster map into one raster, and may provide a second raster map having a lower resolution using this method.

For example, in three-dimensional space, every eight or 27 rasters or the like may be merged into one raster; and in two-dimensional space, every 4 or 9 rasters or the like may be merged into one raster. Each merged raster has an attribute, which may be determined based on the attributes of the plurality of rasters being merged. For example, if one or more of the multiple rasters are occupied, the merged single raster may be determined to be occupied.

In some embodiments, in order to provide more raster maps having different resolutions, rasters in the second raster map may also be merged to generate a third raster map having a third resolution. In addition, rasters in the third raster map may be further merged as needed. Some illustrative embodiments of merging the rasters are described below with reference to FIGS. 3A, 3B, and 4.

At block 208, storing the first raster map and an association between the first raster map and the second raster map. For example, after generating the raster maps of multiple resolutions (e.g., the first raster map and the second raster map), the map generation module 130 stores the first raster map in the map database 150. Moreover, for the second raster map having a lower resolution, some embodiments of the present disclosure do not store the second raster map itself, but instead store an association between the first raster map and the second raster map (e.g., the spatial index between the two raster maps), such that the second raster map is dynamically generated by the first raster map and the association, saving storage space in the map database.

As will be appreciated from the above description, the process 200 according to some embodiments of the present disclosure are capable of meeting different levels of navigation or positioning requirements by generating raster maps of multiple resolutions. At the same time, some embodiments of the present disclosure store only the raster map having the highest resolution, rather than directly storing raster maps of lower resolutions, thereby saving the storage space.

In some embodiments, when an update to the map database is required, the map-updating module 140 may obtain updated laser point cloud and register the updated laser point cloud with the pre-update laser point cloud by adjusting the coordinate system of the updated laser point cloud to coincide with the coordinate system of the pre-update laser point cloud, thereby updating the map database using the registered updated laser point cloud. According to some embodiments of the present disclosure, updating the raster map by applying a point cloud registration method may update only a part of the first raster map, thereby achieving the effect of a partial update of the map. It should be understood that in the embodiments according to the present disclosure, since only the raster map having the highest resolution is stored in the map database 150, the update is performed at the highest resolution when the map is updated.

In some embodiments, in the process of point cloud registration, an objective function for all corresponding points may be set first, and the updated laser point cloud is transformed by a rotation and translation matrix. For example, the transformed laser point cloud may be compared with the original laser point cloud. As long as there are two points with a distance less than the threshold in the two point clouds, the two points are considered to be corresponding points. After obtaining a set of corresponding points, the rotation and translation may be estimated based on the corresponding points. Next, the discovery of the corresponding points and the estimation of the rotation and translation may be performed iteratively until convergence. That is to say, the rotation and translation may be fixed first to find the optimal corresponding points by using the nearest neighbor algorithm, and then the optimal corresponding points are fixed to optimize the rotation and translation, so that the value of the objective function is continuously reduced until convergence, thereby completing the registration between the point clouds.

Figure 3A:
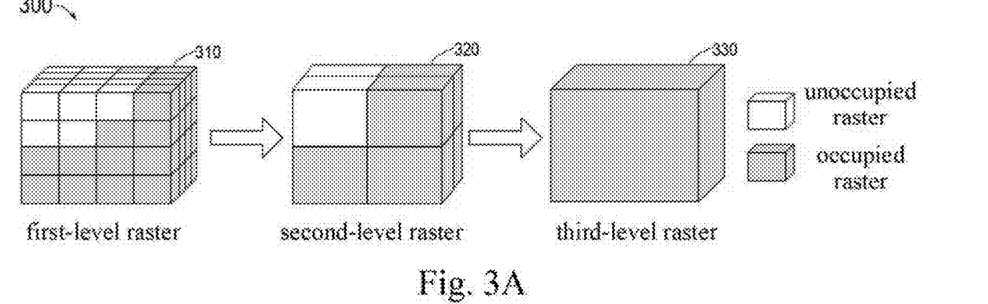
FIG. 3A shows a schematic diagram of raster merging according to some embodiments of the present disclosure.

FIG. 3A shows a schematic diagram 300 of raster merging according to some embodiments of the present disclosure. As shown in FIG. 3A, the raster map in a first-level raster 310 is the highest resolution map, which is stored in the map database. According to some embodiments of the present disclosure, every eight rasters in the first-level raster 310 (2 in length, width and height in the stereo space) may be merged into one raster, thereby generating a second-level raster 320. Every eight rasters in the second-level raster 320 may further be merged into one raster, thereby generating a third-level raster 330. During the raster merging, the multi-dimensional attribute is re-determined for each merged raster. For example, for the occupy attribute, if one or more occupied rasters exist in the eight lower-level rasters, the merged upper-level raster is determined to be occupied. On the contrary, if there is no occupied raster in the eight lower-level rasters, the merged upper-level raster is determined to be unoccupied, as shown in FIG. 3A.

Figure 3B:
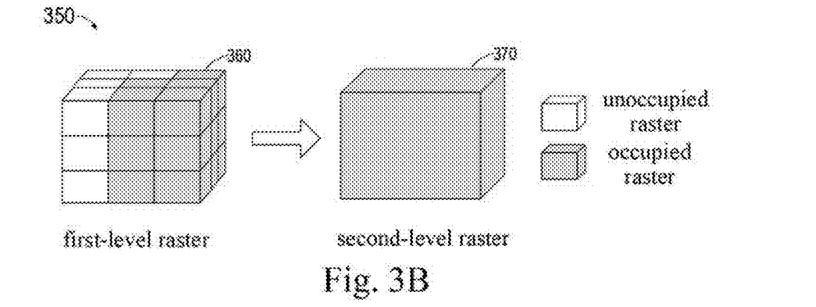
FIG. 3B shows another schematic diagram of raster merging according to some embodiments of the present disclosure.

FIG. 3B shows another schematic diagram 350 of raster merging according to some embodiments of the present disclosure. As shown in FIG. 3B, the raster map in a first-level raster 360 is the highest resolution map, which is stored in the map database. According to some embodiments of the present disclosure, every twenty-seven rasters in the first-level raster 360 (3 in length, width and height in the stereo space) may be merged into one raster, thereby generating a second-level raster 370. During the raster merging, the multi-dimensional attribute is re-determined for each merged raster. For example, for the occupy attribute, if one or more occupied rasters exist in the twenty-seven lower-level rasters, the merged upper-level raster is determined to be occupied. On the contrary, if there is no occupied raster in the twenty-seven lower-level rasters, the merged upper-level raster is determined to be unoccupied, as shown in FIG. 3B.

Figure 4:
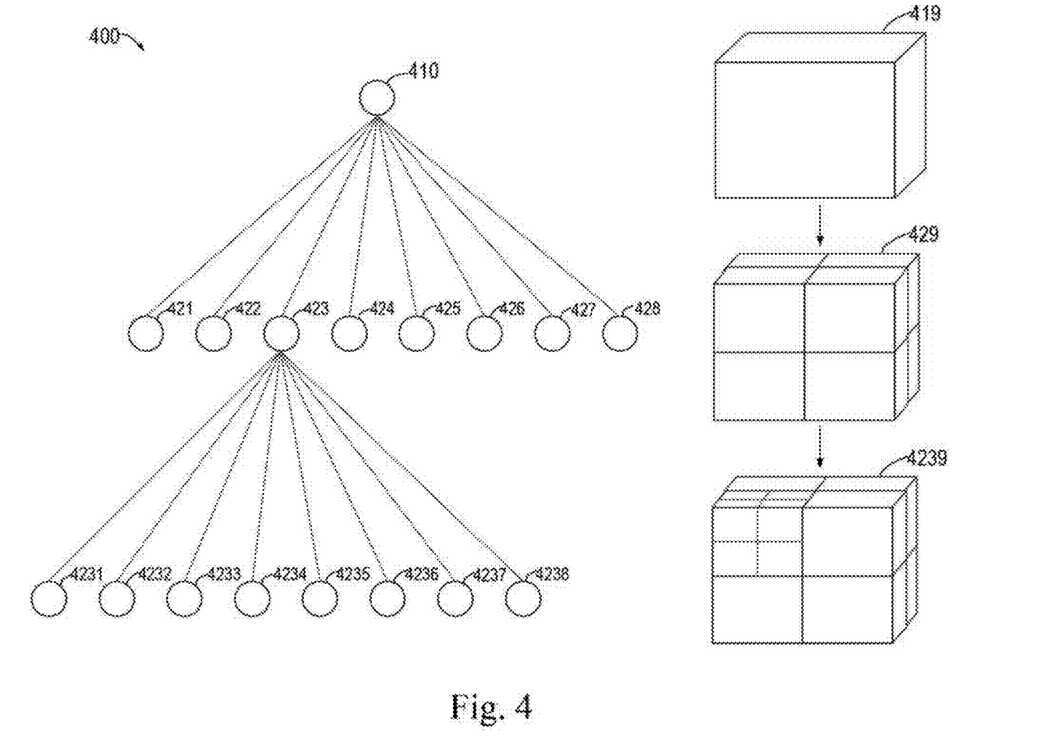
FIG. 4 shows a schematic diagram of an octree spatial index according to some embodiments of the present disclosure.

FIG. 4 shows a schematic diagram 400 of an octree spatial index according to some embodiments of the present disclosure. For example, an octree spatial index is used to establish the association between raster maps of different resolution levels. As shown in FIG. 4, a node 410 may correspond to a raster in the raster map 419, and have eight branch nodes 421, 422, 423, 424, 425, 426, 427, and 428, each of which corresponds to a raster in the raster map 429. That is, the raster corresponding to the node 410 is generated by merging the eight rasters corresponding to the nodes 421, 422, 423, 424, 425, 426, 427, and 428. The node corresponding to each raster in the raster map 429 also has eight branch nodes. For example, the node 423 has eight branch nodes 4231, 4232, 4233, 4234, 4235, 4236, 4237, and 4238, each of which corresponds to a raster in a raster map 4239. In this way, based on the raster map 4239 of the highest resolution (which has the largest number of rasters and the highest resolution, as described above), the raster map 429 of the lower resolution and the raster map 419 of the lowest resolution may be quickly determined by the octree spatial index. When the map is invoked, it may be possible to quickly switch between these raster maps of different resolution according to the required resolution to meet the navigation and positioning requirements of different resolutions.

Figure 5:
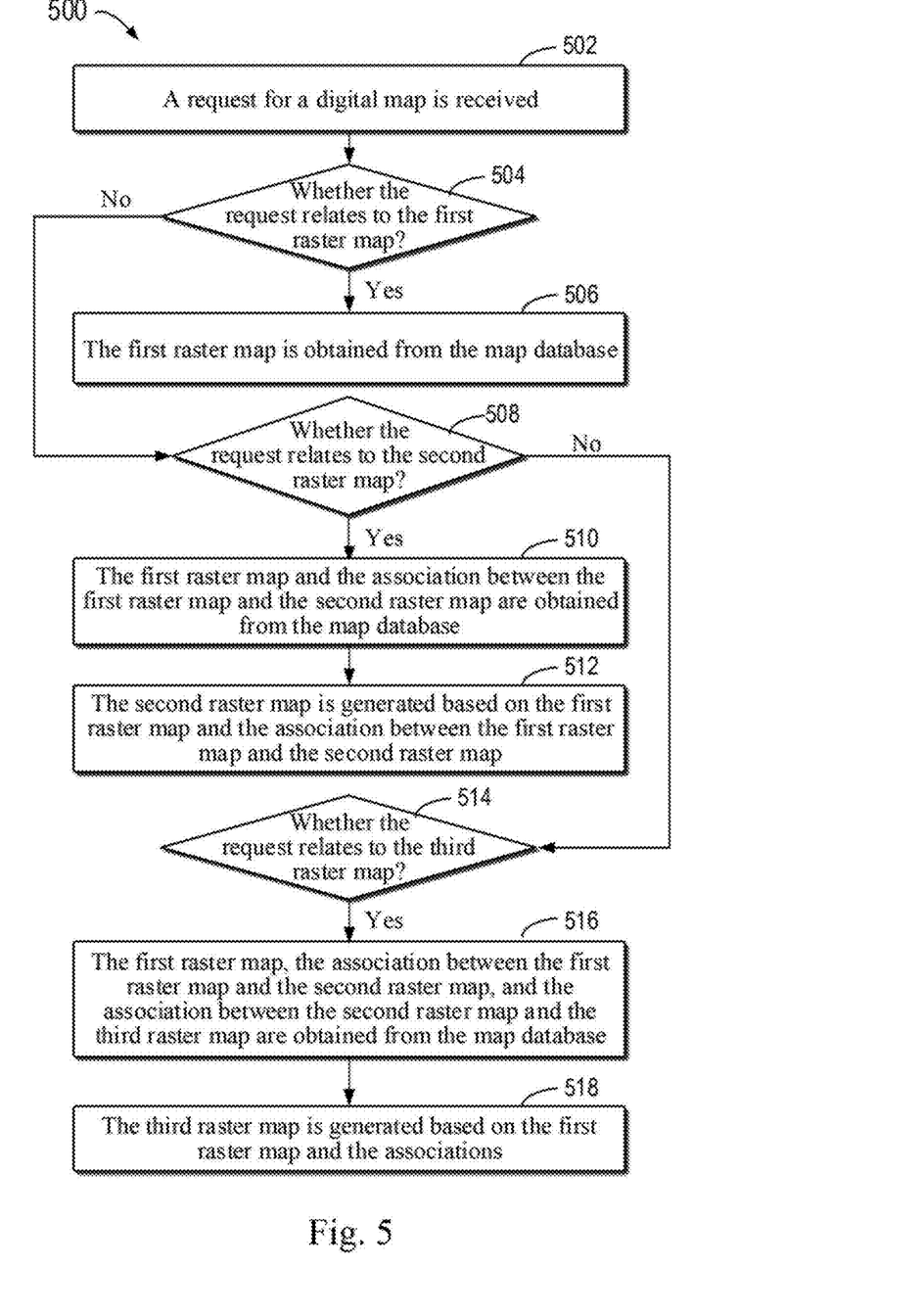
FIG. 5 shows a flowchart of a process for invoking a raster map according to some embodiments of the present disclosure.

FIG. 5 shows a flowchart of a process 500 for invoking a raster map according to some embodiments of the present disclosure. It should be understood that the process 500 may be performed by the map generation module 130 or a storage scheduling module in the map database 150 described above with reference to FIG. 1.

At block 502, a request for a digital map is received, for example, in an autonomous driving scenario or an indoor robot navigation scenario, receiving a scheduling request by the computing device for the raster map.

At block 504, a determination is made as to whether the request relates to the first raster map, i.e., a raster map of the highest resolution. If it is determined that the request relates to the first raster map, since the first raster map already exists in the map database, then at block 506, the first raster map may be obtained directly from the map database (e.g., the map database 150).

If it is determined at block 504 that the request involves the raster map other than the first raster map, then at block 508, a determination is made as to whether the request relates to the second raster map. If so, since the second raster map is not the map of the highest resolution, it is not stored directly in the map database 150, then at block 510, the first raster map and the association between the first raster map and the second raster map (e.g., the spatial index) are obtained from the map database 150. At block 512, the second raster map is dynamically generated based on the first raster map and the association between the first raster map and the second raster map.

On the other hand, if it is determined at block 508 that the request is not related to the second raster map, then at block 514, it is determined whether the request relates to the third raster map of a lower resolution level. If it is determined that the request relates to the third raster map, since the third raster map is not the map of the highest resolution, it is not stored directly in the map database, then at block 516, the first raster map, the association between the first raster map and the second raster map, and the association between the second raster map and the third raster map are obtained from the map database. Then at block 518, the third raster map is dynamically generated based on the first raster map, the association between the first raster map and the second raster map, and the association between the second raster map and the third raster map.

By means of the above process, the raster maps can be retrieved step by step in descending order of resolution, in response to the request for a map. Of course, this is not obligatory. For example, in some alternative embodiments, an association index between the first raster map and the third raster map may also be generated directly, thereby generating the third raster map directly without the second raster map. Further, in the process 500, if the request does not involve the third raster map, then other processing may be performed.

According to some embodiments of the present disclosure, generating the second raster map from the first raster map or generating the third raster map from the first raster map is very fast by using the octree spatial index, thereby ensuring the timeliness of map invoking.

Figure 6:
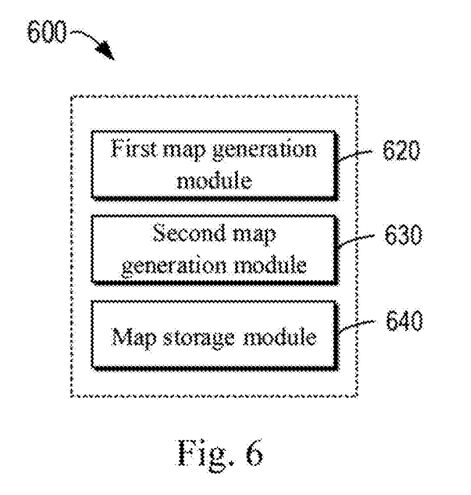
FIG. 6 shows a block diagram of an apparatus for generating a raster map according to some embodiments of the present disclosure.

FIG. 6 shows a block diagram of an apparatus 600 for generating a raster map according to some embodiments of the present disclosure. As shown in FIG. 6, the apparatus 600 includes a first map generation module 620, a second map generation module 630, and a map storage module 640. The first map generation module 620 is configured to generate a first raster map having a first resolution based on acquired laser point cloud. In some embodiments, the first map generation module 620 may include a point cloud acquisition module (not shown) for obtaining a laser point cloud acquired by a laser acquisition entity. In addition, the second map generation module 630 is configured to generate a second raster map having a second resolution by merging rasters in the first raster map, the second resolution being lower than the first resolution. The map storage module 640 is configured to store the first raster map and an association between the first raster map and the second raster map. In some embodiments, the apparatus 600 further includes a third map generation module (not shown), configured to generate a third raster map having a third resolution by merging rasters in the second raster map, the third resolution being lower than the second resolution.

It should be understood that the first map generation module 620, the second map generation module 630, and the map storage module 640 shown in FIG. 6 may be included in the map generation module 130 described with reference to FIG. 1. Moreover, it should be understood that the modules illustrated in FIG. 6 may perform steps or actions in the method or process with reference to some embodiments of the present disclosure.

Figure 7:
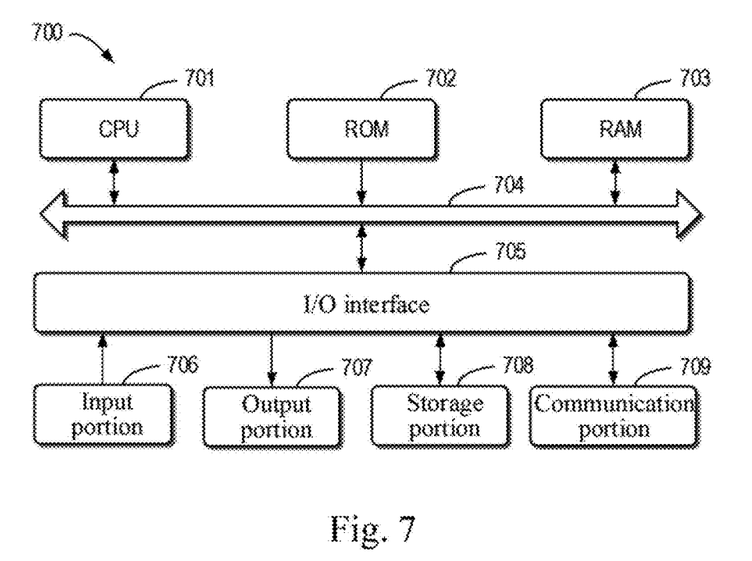
FIG. 7 shows a block diagram of a computing device capable of implementing various embodiments of the present disclosure.

FIG. 7 shows a schematic block diagram of an illustrative device 700 capable of implementing various embodiments of the present disclosure. The device 700 may be used to implement the apparatus 600 for generating a raster map of the present disclosure. As shown in the figure, the device 700 includes a central processing unit (CPU) 701 that may perform various appropriate actions and processing in accordance with computer program instructions stored in a read only memory (ROM) 702 or computer program instructions loaded into a random access memory (RAM) 703 from a storage unit 708. In the RAM 703, various programs and data required for the operation of the device 700 may also be stored. The CPU 701, the ROM 702, and the RAM 703 are connected to each other through a bus 704. An input/output (I/O) interface 705 is also coupled to the bus 704.

A plurality of components in the device 700 are coupled to the I/O interface 705, including: an input unit 706, such as a keyboard or a mouse; an output unit 707, such as various types of displays or speakers; the storage unit 708, such as a disk or an optical disk; and a communication unit 709 such as a network card, a modem, or a wireless communication transceiver. The communication unit 709 allows the device 700 to exchange information/data with other devices over a computer network such as the Internet and/or various telecommunication networks.

The processing unit 701 performs the various methods and processes described above, such as the process 200 and/or the process 500. For example, in some embodiments, the process 200 and/or the process 500 may be implemented as a computer software program that is tangibly embodied in a machine readable medium, such as the storage unit 708. In some embodiments, some or all of the computer programs may be loaded and/or installed onto the device 700 via the ROM 702 and/or the communication unit 709. When a computer program is loaded into the RAM 703 and executed by the CPU 701, one or more of the actions or steps of the process 200 and/or the process 500 described above may be performed. Alternatively, in other embodiments, the CPU 701 may be configured to perform the process 200 and/or the process 500 by any other suitable means (e.g., by means of firmware).

The functions described herein above may be performed, at least in part, by one or more hardware logic components. For example, and without limitation, illustrative types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions or steps are described in a specific order, this should not be understood that such actions or steps are required to be performed in the specific order shown or in sequential order, or all illustrated actions or steps should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although some embodiments of the present disclosure are described in language specific to structural features and/or method logic actions, it should be understood that the subject matter defined in the appended claims is not limited to the specific features or actions described above. Instead, the specific features and actions described above are merely illustrative forms of implementing the claims.

What is claimed is:

1. A method for generating a raster map, the method comprising:
   generating a first raster map having a first resolution based on acquired laser point cloud;
   generating a second raster map having a second resolution by merging every preset number of rasters in the first raster map, the second resolution being lower than the first resolution; and
   storing the first raster map and an association between the first raster map and the second raster map;
   wherein the generating the first raster map comprises:
   generating a multi-dimensional attribute of each of the rasters in the first raster map for providing navigation and positioning capabilities, the multi-dimensional attribute comprising an occupancy attribute indicating whether a raster being occupied, an average reflectivity attribute for determining a material of an obstacle in an environment, a color attribute representing a color of the obstacle in the environment, a density attribute for determining a type of the obstacle in the environment, and a curvature attribute for fitting a characteristic of a curved surface of the obstacle in the environment.

2. The method according to claim 1, further comprising:
   establishing the association between the first raster map and the second raster map using an octree spatial index.

3. The method according to claim 1, further comprising:
   generating the second raster map using the stored association and the first raster map, in response to a digital map request relating to the second raster map.

4. The method according to claim 1, further comprising:
   generating a third raster map having a third resolution by merging rasters in the second raster map, the third resolution being lower than the second resolution; and
   storing the association between the second raster map and the third raster map.

5. The method according to claim 1, wherein the color attribute is generated based on the laser point cloud and a photo associated with the laser point cloud.

6. The method according to claim 1, further comprising:
   acquiring updated laser point cloud;
   registering the updated laser point cloud with the laser point cloud by adjusting a coordinate system of the updated laser point cloud based on the coordinate system of the laser point cloud; and
   updating the first raster map using the registered updated laser point cloud.

7. The method according to claim 6, wherein the updated laser point cloud is associated with a part of the laser point cloud, and the updating the first raster map comprises:
   updating the part of the first raster map using the registered updated laser point cloud.

8. An apparatus for generating a raster map, the apparatus comprising:
   at least one processor; and
   a memory storing instructions, the instructions when executed by the at least one processor, cause the at least one processor to perform operations, the operations comprising:
   generating a first raster map having a first resolution based on acquired laser point cloud;
   generating a second raster map having a second resolution by merging every preset number of rasters in the first raster map, the second resolution being lower than the first resolution; and
   storing the first raster map and an association between the first raster map and the second raster map;
   wherein the generating the first raster map comprises:
   generating a multi-dimensional attribute of each of the rasters in the first raster map for providing navigation and positioning capabilities, the multi-dimensional attribute comprising an occupancy attribute indicating whether a raster being occupied, an average reflectivity attribute for determining a material of an obstacle in an environment, a color attribute representing a color of the obstacle in the environment, a density attribute for determining a type of the obstacle in the environment, and a curvature attribute for fitting a characteristic of a curved surface of the obstacle in the environment.

9. The apparatus according to claim 8, wherein the operations further comprise:
   establishing the association between the first raster map and the second raster map using an octree spatial index.

10. The apparatus according to claim 8, wherein the operations further comprise:
    generating the second raster map using the stored association and the first raster map, in response to a digital map request relating to the second raster map.

11. The apparatus according to claim 8, wherein the operations further comprise:
    generating a third raster map having a third resolution by merging rasters in the second raster map, the third resolution being lower than the second resolution; and
    storing the association between the second raster map and the third raster map.

12. The apparatus according to claim 8, wherein the color attribute is generated based on the laser point cloud and a photo associated with the laser point cloud.

13. The apparatus according to claim 8, wherein the operations further comprise:
    acquiring updated laser point cloud;
    registering the updated laser point cloud with the laser point cloud by adjusting a coordinate system of the updated laser point cloud based on the coordinate system of the laser point cloud; and
    updating the first raster map using the registered updated laser point cloud.

14. The apparatus according to claim 13, wherein the updated laser point cloud is associated with a part of the laser point cloud, and the updating the first raster map comprises:
    updating the part of the first raster map using the registered updated laser point cloud.

15. A non-transitory computer-readable storage medium storing a computer program, the computer program when executed by one or more processors, causes the one or more processors to perform operations, the operations comprising:
    generating a first raster map having a first resolution based on acquired laser point cloud;

generating a second raster map having a second resolution by merging every preset number of rasters in the first raster map, the second resolution being lower than the first resolution; and storing the first raster map and an association between the first raster map and the second raster map;

wherein the generating the first raster map comprises:

generating a multi-dimensional attribute of each of the rasters in the first raster map for providing navigation and positioning capabilities, the multi-dimensional attribute comprising an occupancy attribute indicating whether a raster being occupied, an average reflectivity attribute for determining a material of an obstacle in an environment, a color attribute representing a color of the obstacle in the environment, a density attribute for determining a type of the obstacle in the environment, and a curvature attribute for fitting a characteristic of a curved surface of the obstacle in the environment.

* * * * *